(No Model.) 2 Sheets—Sheet 1.

W. C. HODNETT.
VEHICLE WHEEL.

No. 359,445. Patented Mar. 15, 1887.

WITNESSES:
Fred G. Dieterich
Edw. W. Byrn

INVENTOR:
W. C. Hodnett
BY Munn & Co
ATTORNEYS.

(No Model.) 2 Sheets—Sheet 2.

W. C. HODNETT.
VEHICLE WHEEL.

No. 359,445. Patented Mar. 15, 1887.

WITNESSES:
Fred G. Dieterich
Edw. W. Byrn

INVENTOR:
W. C. Hodnett
BY Munn & Co
ATTORNEYS.

UNITED STATES PATENT OFFICE.

WILLIAM CRITTENDEN HODNETT, OF DOUGLASVILLE, GEORGIA.

VEHICLE-WHEEL.

SPECIFICATION forming part of Letters Patent No. 359,445, dated March 15, 1887.

Application filed November 12, 1886. Serial No. 218,730. (No model.)

*To all whom it may concern:*

Be it known that I, WILLIAM CRITTENDEN HODNETT, of Douglasville, in the county of Douglas and State of Georgia, have invented a new and useful Improvement in Vehicle-Wheels, of which the following is a specification.

My invention relates to vehicle-wheels; and it consists in the peculiar construction and arrangement of the tire, spokes, and hub, which I will now proceed to describe with reference to the accompanying drawings, in which—

Figure 1:
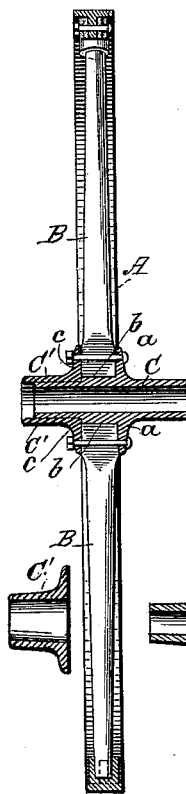
Figure 2:
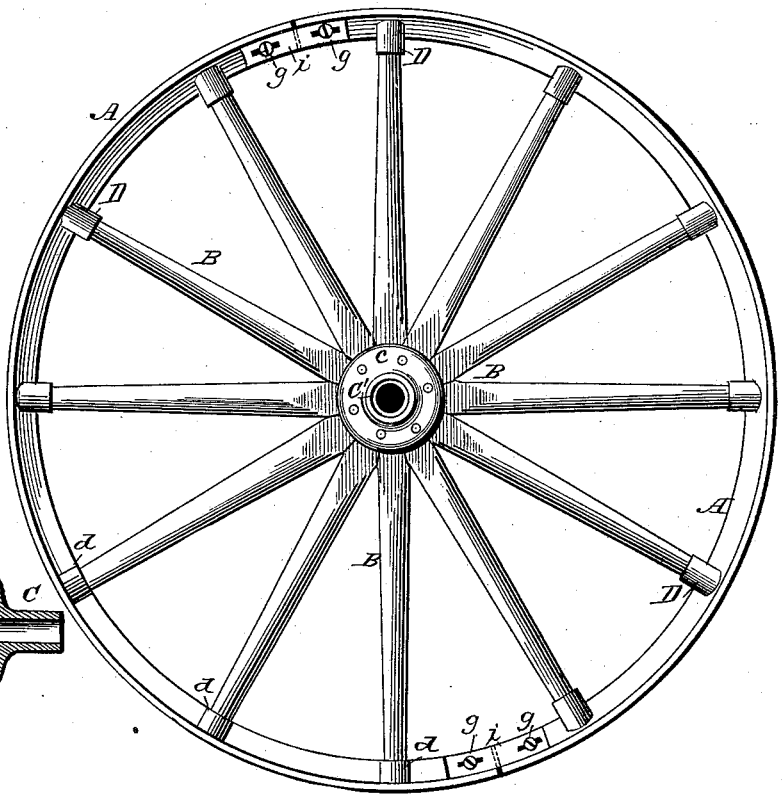
Figure 3:
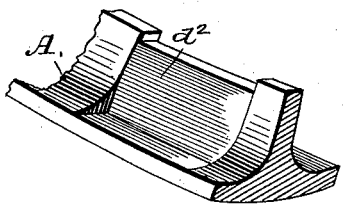
Figure 4:
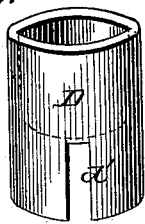
Figure 5:
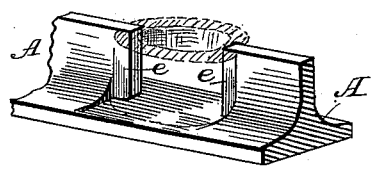
Figure 6:
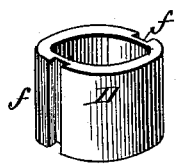
Figure 7:
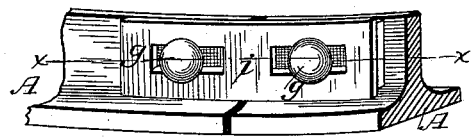
Figure 8:
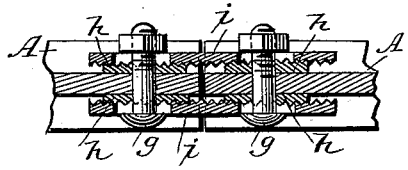

Figure 1 is a central section of the wheel; Fig. 2, a side elevation of the same. Figs. 3 and 4 are perspective views of a section of the tire and a cuff forming a means for connecting the spokes to the tire. Figs. 5 and 6 are perspective views of a section of tire and cuff forming still another means for connecting the tire and spokes. Fig. 7 is a side view, and Fig. 8 a section through line $x$ $x$, of a means for joining the sections of the tire.

The wheel is composed of a tire, A A, made of two semicircular pieces of metal, spokes B, and a central metal sectional hub composed of a box, C, having a flange, $a$, and shoulder $b$, and a sleeve, C', having a flange, $c$, which sleeve fits over the box and up against the shoulder $b$, while the two flanges $a$ and $c$ are bolted together between the inner ends of the spokes, which latter are thereby rendered easily removable from their sockets.

The tire is composed of T-shaped metal, and the spokes may be connected to the same by sockets $d$, Figs. 1 and 2, formed in the metal of the tire, or by independent detachable cuffs D. These detachable cuffs I may also construct and adapt to the tire in several different ways. Thus, I may, as in Fig. 4, make them in the form of a socket having in its end a diametrical slit, $d'$, and the tire may, as in Fig. 3, be notched at $d^2$, to receive this slitted end, so as to hold it against displacement both laterally and lengthwise the tire; or, as in Figs. 5 and 6, the tire may have its web cut away and tongues $e$ left at the edges of the same, which fit into grooves $f$ $f$ on the outer periphery of the cuff, to secure the same result of a secure but detachable connection.

For connecting the two semicircular sections of tire, near the end of each section a bolt-hole is formed in their web portions, through which passes the two bolts $g$ $g$. On each side of the web at each bolt there is placed a corrugated metal plate, $h$, Fig. 8, having each a bolt-hole which is closely fitted to the bolt that passes through the plate $h$, being applied with the corrugations parallel with the spokes and facing outwardly. To the outer faces of these corrugated plates is applied on each side the long corrugated splice-plates $i$ $i$, which extend from bolt to bolt and have elongated slots in their sides, through which the bolts pass. These splice-plates, when the bolts are tightened, connect the two sections of the tire adjustably or in such manner that they may be loosened and readjusted to take up looseness or permit contraction. It will be seen that the small plates $h$ are held by the bolts, and the teeth of these small plates, meshing with the teeth of the splice-plates, also engage them, so that they hold the two tire-sections together. To readjust them, the bolts are loosened, the splice-plates taken out of engagement with plates $h$ $h$, and after being adjusted longitudinally by reason of their slots the teeth are adjusted to mesh again, and the bolts then tightened.

Having thus described my invention, what I claim as new is—

1. The combination of the T-shaped tire having its web portion notched or cut away, the cuff D, slitted or grooved to fit said web and lock against displacement, and the spokes fitted in said cuffs, as and for the purpose described.

2. A tire for a vehicle, made in T shape in cross-section, and having its web perforated at the ends of the sections and provided with corrugated plates $h$ $h$, bolts $g$ $g$, and elongated and slotted splice-plates $i$, having corrugations meshing with the corrugations on the inner plates, substantially as and for the purpose described.

WILLIAM CRITTENDEN HODNETT.

Witnesses:
A. B. PERDUE,
JOE. W. DORSETT.